United States Patent [19]

Dean

[11] Patent Number: 5,125,180

[45] Date of Patent: Jun. 30, 1992

[54] FISHHOOK BAITING TOOL

[76] Inventor: Gordon G. Dean, 5926 Jargon Way, Kearns, Utah 84118

[21] Appl. No.: 797,079

[22] Filed: Nov. 25, 1991

[51] Int. Cl.$^5$ ............................................. A01K 97/00
[52] U.S. Cl. ........................................................ 43/4
[58] Field of Search ............................................ 43/4

[56] References Cited

U.S. PATENT DOCUMENTS

| 2,948,979 | 8/1960 | Kulp | 43/4 |
| 3,975,853 | 8/1976 | Aaron | 43/4 |
| 4,118,881 | 10/1978 | McFarland | 43/4 |
| 4,848,019 | 7/1989 | Toogood | 43/4 |
| 4,881,337 | 11/1989 | Mehl | 43/4 |

Primary Examiner—Kurt Rowan
Attorney, Agent, or Firm—Dowell & Dowell

[57] ABSTRACT

A tool for baiting a worm on a fishhook which includes an elongated rod having an opening in the outer end thereof for receiving the tip of a fishhook and a line tensioning device spaced from the rod for retaining the fishing line and hook taut as the bait is applied.

8 Claims, 3 Drawing Sheets

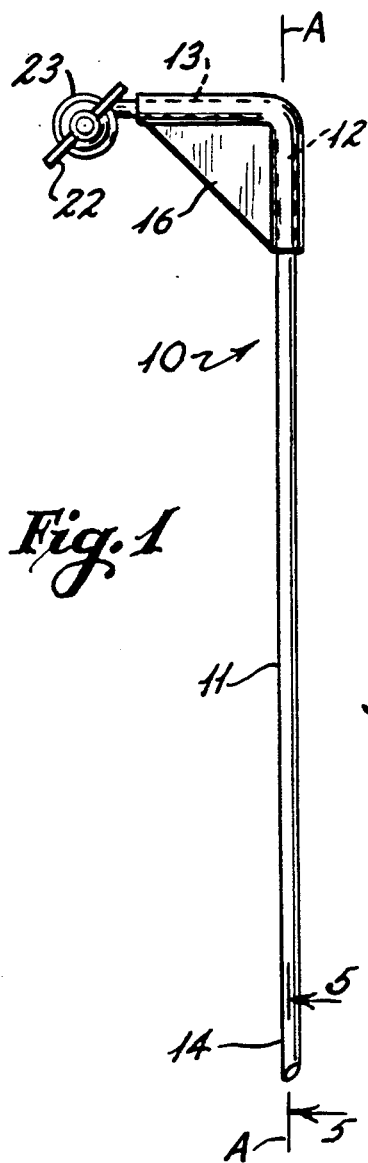
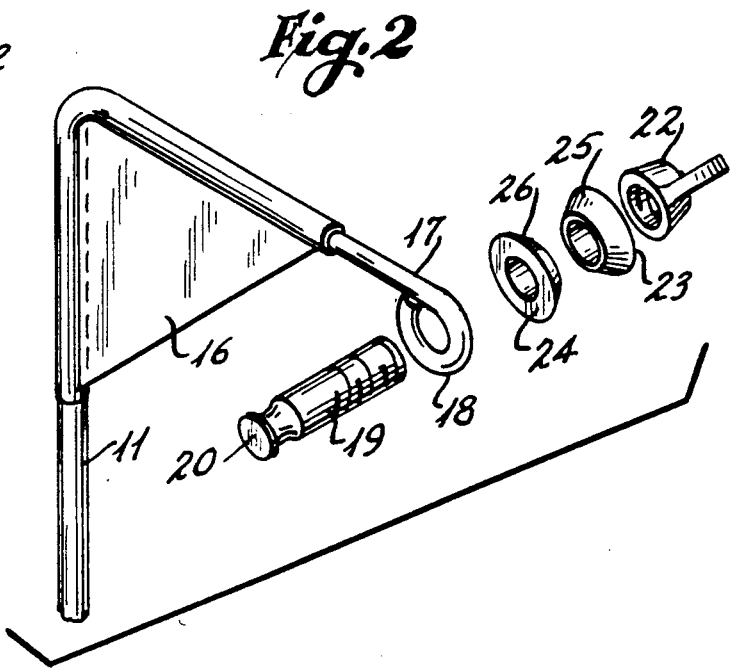
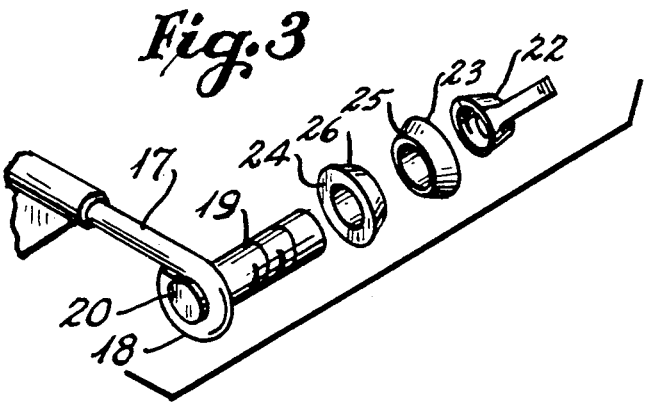
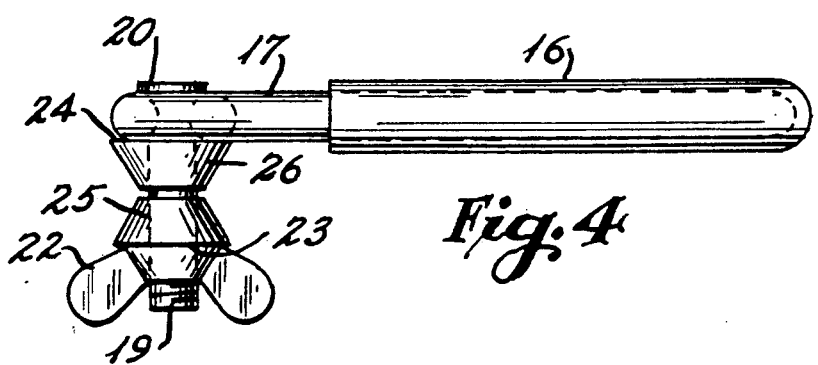

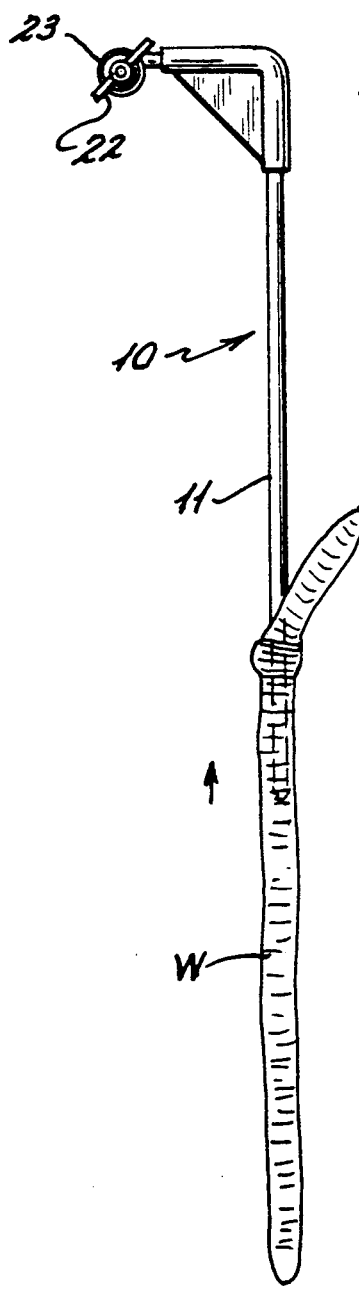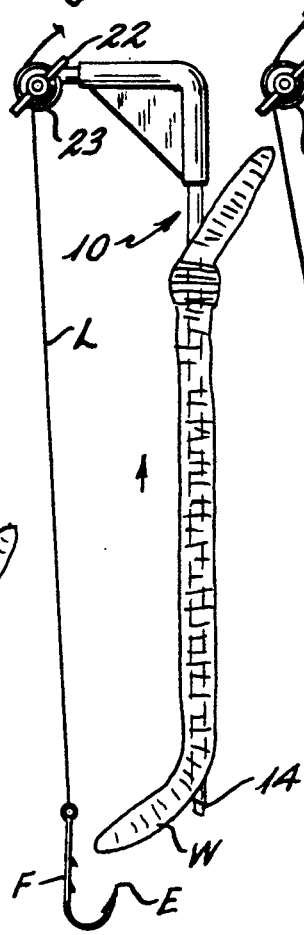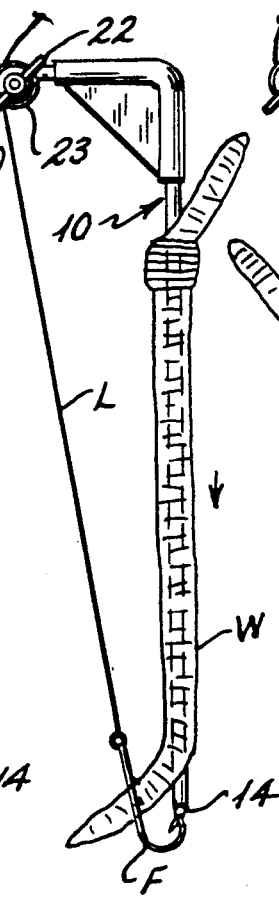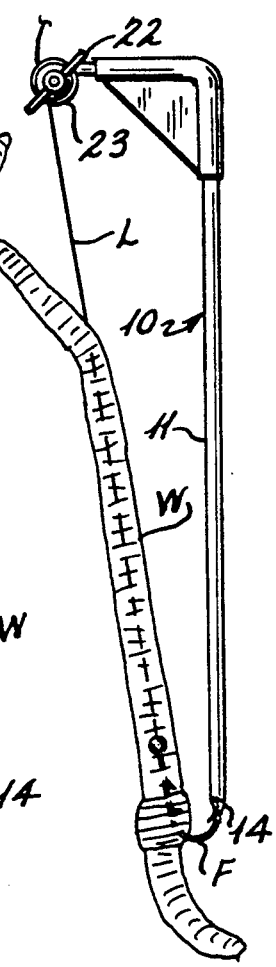
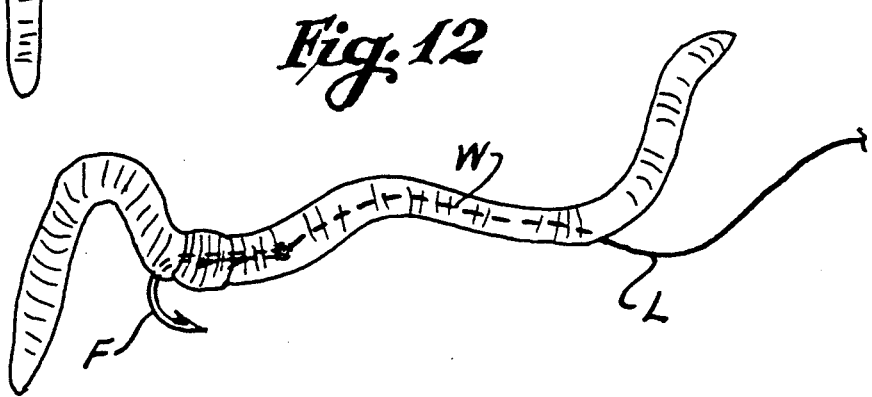

FISHHOOK BAITING TOOL

BACKGROUND OF THE INVENTION

1. Field of the Invention

This invention is generally directed to devices for applying bait to fishhooks and, more specifically, to a device which includes a first rod member for initially retaining a worm and for supporting the tip of a fishhook so that the worm may be urged onto the hook from the rod and wherein a tensioning device is also provided for securely engaging the fishing line extending from the hook utilizing a pair of opposing washer members which frictionally engage the fishing line therebetween in such a manner that not only may the tension on the fishing line may be readily adjusted but the tension on the line is maintained leaving the fisherman free to use both hands to bait the worm from the rod and onto the hook.

2. History of the Related Art

When fishing with live bait, and especially with worms of various varieties, it is important to insure that the bait is properly baited to the fishhook so as to insure that the bait is retained on the hook during casting and also to create the most natural appearance of the bait relative to the hook. A further consideration is that loss of bait often occurs because the bait is improperly placed upon a hook thereby allowing fish to attack the bait without ever having to approach the barbed end of the hook. Over the years it has been appreciated that a significant length of the worm should extend along the entire body of hook leaving the barb free or extending from the body of the worm when baited. Such a baiting technique utilizing a freely movable hook requires a great deal of dexterity as the bait must be forced around the curvature in the hook while tension is applied in the area of the line above the hook.

To facilitate the baiting of live bait such as earthworms and the like to fishing hooks there have been numerous bait devices developed for initially placing the bait over an elongated rod or needle and thereafter sliding the worm from the rod over the fishhook. In U.S. Pat. No. 4,073,083 to Davis, a fishing worm threader is disclosed which includes a handle which supports an elongated hollow tube or needle having an opening in the outer end thereof for selectively receiving the end of a fishhook. With the device, the bait is initially inserted or threaded through a substantial length of the body portion of the worm so that the hollow end portion extends outwardly of the body of the worm so as to readily receive the end of a fishing hook. Utilizing the device, tension is applied to the fishing line and the fisherman thereafter pulls the worm along the rod and onto the fishing hook while maintaining tension on the fishing line. Unfortunately, with this type of device, the fisherman must utilize one hand to control the tension on the fishing line, as the line must be taut in order to prevent the fishhook from disengaging from the open end of the worm support rod as the worm is forced from the rod to the fishhook.

To facilitate the retention of tension along the fishing line, other inventors proposed structures for securing the fishing line relative to the rod upon which the worm or bait is initially impaled. In U.S. Pat. No. 2,948,979 to Kulp, a baiting device is disclosed which incorporates a tension device which includes an outer generally U-shaped component around which the fishing line is initially wrapped, with the fishing line thereafter being inserted between a pair of metallic rod elements which frictionally pinch the fishing line therebetween to retain the line in wrapped relationship about the U-shaped portion of the tensioning device. Unfortunately, with this type of device, no adjustment can easily be made to the amount of tension applied along the fishing line to the fish hook once the hook is engaged with the bar threaded through the length of the worm without first having to disengage the line from between the opposing metal components which clamp the line and thereafter unwinding the line relative to the U-shaped component of the tensioning device. Such manipulation is complex and will frequently result in the tension being lost between the fishing line and the fishhook during a period of adjustment, resulting in the fishhook becoming disengaged from the worm support rod. In addition, the pinching action developed by the spring-like members which engage the fish line can actually crush or cut the fishing line, especially if force is applied to the line against or perpendicularly with respect to the crimping elements.

Other types of worm threaders used in fishing are disclosed in U.S. Pat. No. 4,915,631 to Robinson et al., and U.S. Pat. No. 4,848,019 to Toogood. In the Robinson et al. patent, the worm support rod is mounted to a handle that has an outwardly extending fishing line support mounted thereto. The fishing line support includes a groove in which the fishing line may be inserted in order to assist in retaining the line in a taut configuration. With this type of structure, the line is fairly free to shift along the length of the restraining device and therefore does not provide adequate retention for the fishing line. In Toogood, the rod for initially impaling the worm is attached to a pistol-like handgrip and tension applied to the fishing line is supplied by the fisherman urging the fishing line against the pistol grip handle with his or her thumb. Such devices which require that a fisherman utilize one hand to retain tension on the fishing line are not practical as the fisherman is not able to utilize both hands to maneuver the worm from the support rod onto the fishhook.

Additional examples of prior art bait applicators are disclosed in U.S. Pat. No. 4,118,881 to McFarlana and U.S. Pat. No. 4,706,403 to Reynolds.

SUMMARY OF THE INVENTION

Tools for baiting live bait such as worms to fishhooks secured to fishing lines wherein each device includes a rod of a size to be inserted or threaded through a substantial portion of the bait and wherein an opening is provided in the outer end of the rod to receive the tip or end of the fishhook. Each tool also includes a fishing line tensioning member which is disposed in spaced relationship to the elongated axis of the rod and which includes opposing washer-like clamping members carried by a shaft and an adjustment member for selectively regulating the compressive force developed between the washer members so that the fishing line extending from the fishhook is securely retained therebetween. In the preferred embodiment, each washer member includes an inwardly bevelled periphery to thereby facilitate the alignment of the fishing line between opposing washer members. In addition, the washer members are rotatable with respect to their support shaft thereby allowing tensioning of the fishing line upon rotational movement of the adjustment member.

It is a primary object of the present invention to provide a baiting tool for placing live bait such as worms on fishing hooks wherein the tool fixedly retains the fishhook and a portion of the fishing line extending therefrom taut with respect to a rod upon which the bait is initially impaled so the bait may thereafter be threaded onto a hook without the fisherman having to physically maintain tension on the fishing line.

It is also an object of the present invention to provide a baiting tool for securing worms and the like to a fishhook wherein tension is applied to retain the fishhook relative to the baiting tool by a pair of opposing washer-like clamping members which are adjustable relative to one another and which are designed to compressively and frictionally engage the fishing line therebetween in such a manner that no twisting, pinching, cutting or other adverse force is applied to the fishing line which might adversely affect the integrity of the line.

It is yet another object of the present invention to provide a tensioning device for baiting tools of the type utilized to thread live bait such as worms to fishing hooks wherein the fishing line is retained taut and is adjustable to increase the tension by the rotation of an adjustment member relative to a pair of opposing washer-like clamping members so that the amount of tension may be adjusted without having to release the fishing line from a secure engagement with the baiting tool.

BRIEF DESCRIPTION OF THE DRAWINGS

FIG. 1 is a front elevational view of the baiting tool of the present invention.

FIG. 2 is an enlarged partial assembly view of the baiting tool shown in FIG. 1.

FIG. 3 is an enlarged partial assembly view of the tensioning members of the present invention.

FIG. 4 is an enlarged top plan view of the baiting tool of the present invention.

FIG. 7 is a front illustrational view showing a worm being initially baited to the tip of the rod of the baiting tool of the present invention.

FIG. 8 is a front illustrational view showing the worm of FIG. 7 being fully impaled over the rod of the baiting tool of the present invention.

FIG. 9 is a front illustrational view showing the placement of the hook and retention of the fishing line using the baiting tool of the present invention.

FIG. 10 is a front illustrational view showing the worm baited to the hook of the baiting tool of the present invention.

FIG. 12 is an illustrational view of a hook baited utilizing the baiting tool of the present invention.

DESCRIPTION OF THE PREFERRED EMBODIMENT

Figure 5:
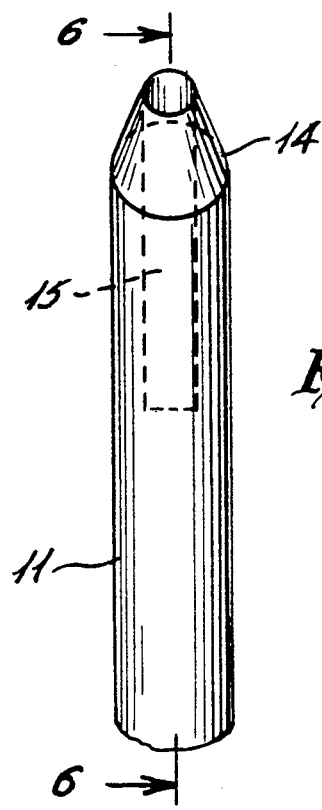
FIG. 5 is an enlarged right side view of the tip of the baiting tool of FIG. 1.
Figure 6:
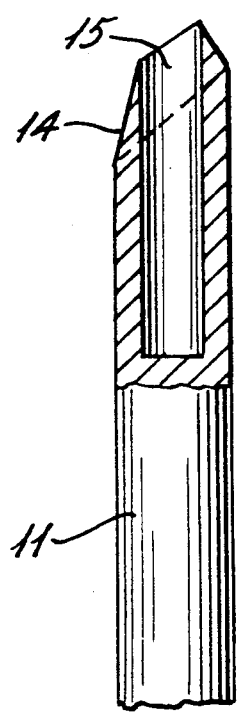
FIG. 6 is a cross-sectional view taken along lines 6—6 of FIG. 5.
Figure 11:
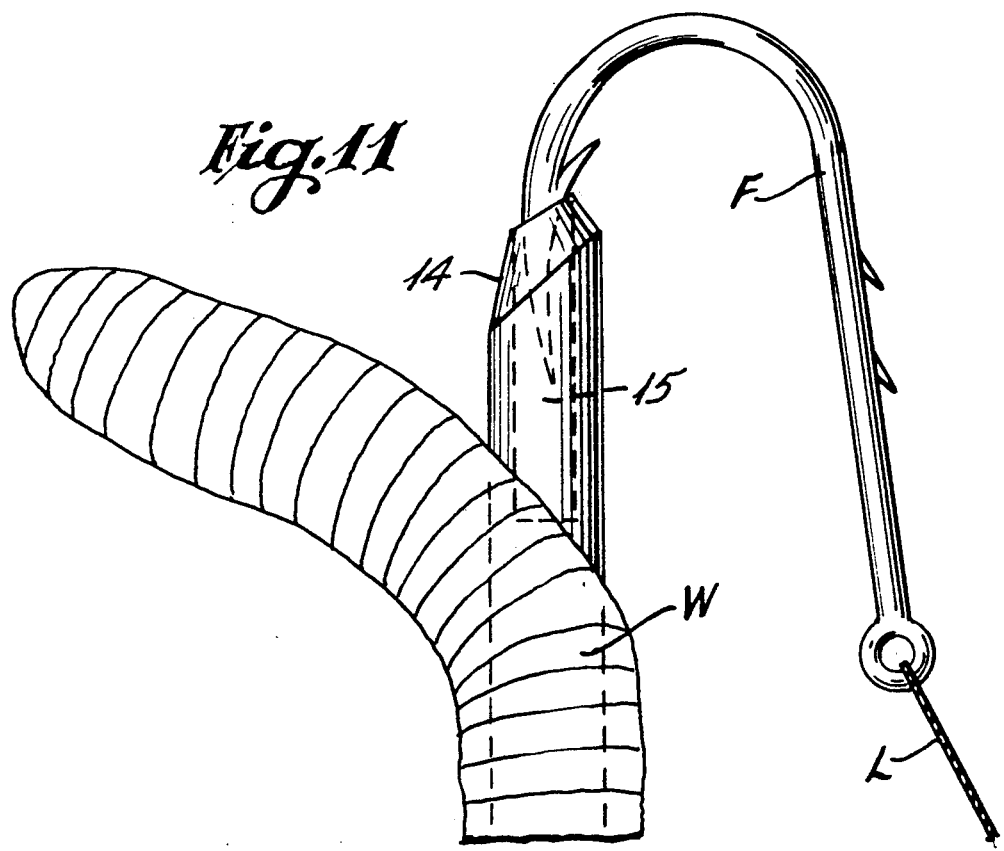
FIG. 11 is a cross-sectional illustrational view of the tip of the baiting tool of FIG. 1 showing a hook positioned therein.

With continued reference to the drawings, the baiting tool 10 of the present invention is shown as including an elongated rod 11 having a base portion 12 which, in the preferred embodiment, includes a generally right angled extension to the rod shown at 13. The outer end portion 14 of the rod is provided with an opening 15 for purposes of receiving the outer end E of a fishhook F attached to a fishing line L. The rod 11 and its base portions 12 and 13 are preferably formed of a surgical or rust resistant material such as plastic, brass, bronze, or stainless steel and is of a diameter of approximately 1/16 of an inch. The rod segment 11 is generally approximately 5 to 6 inches in length with the base extension 13 being approximately 1 inch in length. To facilitate the insertion of the rod into the body of a worm or other live bait W, the tip of end portion 14 may be conically tapered and bevelled, as shown in FIGS. 5, 6 and 11. The opening 15 may extend through only a portion of the rod 11 when the rod is formed of a solid piece of material or the opening 15 may extend along the full length of the rod if the rod is formed from the tubular stock material. In order to resist any bending of the rod 11 along its elongated axis A—A, a reinforcing plate 16 is shown as being secured diagonally between the base portion 13 of the rod and the lower portion 12 thereof. The reinforcing plate 16 may be secured by clamping or folding the edges thereof over the rod portions 12 and 13 or by welding the plate thereto.

The outermost end portion 17 of the base rod portion 13 is bent to form a loop, as shown at 18 in drawing FIG. 2. A shaft 19 extends through the loop 18 and is secured thereto by friction fit or welding. The shaft includes a head portion 20 which engages one side of the loop 18. Although the entire shaft 19 may include screw threads for selectively receiving an adjustment member 22, such as a conventional wing nut, in the preferred embodiment, the innermost portion of the shaft 19 is not threaded and serves as a support bearing for a pair of opposing washer or clamping members 23 and 24. The opposing washers 23 and 24, taken together with the adjusting members 22 and shaft 19, form a tensioning device for securing a portion of fishing line therebetween as shown in FIGS. 7-10. To facilitate the insertion of the fishing line between the opposing washer members 23 and 24, each of the washer members is preferably provided with opposing and inwardly tapered peripheral portions 26 and 27, respectively, which define a V-shaped opening into the opposing faces of the washer members.

The washer members 23 and 24 are preferably formed of a slightly resilient material such as a neoprean or rubber so as to exhibit a substantially high coefficient of friction along the opposing faces thereof even though such material is generally smooth. In this manner, the fishing line extending between the washer elements 23 and 24 is securely retained therebetween without any damaging cutting or crimping action being applied to the fishing line even when the fastening device 22 is adjusted to compress the members relative to one another. In the event additional tension is required on the portion of the fishing line extending from the fishing hook F to the tensioning device, it is only necessary to adjust the nut 22 by tightening it relative to the shaft 19 to thereby simultaneously rotate the opposing washer elements 23 and 24 relative to the support shaft 19, which action will pull or place more tension along the fishing line. Therefore, tensioning of the fishing line may be increased without having to remove the fishing line from engagement between the washer elements 23 and 24. Due to the nature of the washer elements, there is no crimping or bending of the fishing line so that the integrity of the fishing line is maintained as it is retained in the tensioning device.

In the use of the baiting tool of the present invention, the bait, such as a worm, is initially suspended to elongate the body therefof to thereby facilitate the threading or impaling of the worm with the rod 11. The rod is preferably inserted in the worm by initiating penetration just prior to the clitellum, which is easily recognized as the enlarged ring portion of the worm's body. The rod is extended through a substantial portion of the length of the worm and then exited at a point remote from the opposite end of the worm. With the worm fully inserted on the rod 11, as shown in FIG. 8, the tip E of the fishhook F is placed within the opening 15 at the end of the rod and the fishing line L is pulled tight to securely engage the fishhook relative to the rod as shown in FIG. 9 or 11. It should be noted that the hook is firmly seated with respect to the end of the tool rod as the bevelled portion of the tip is oriented away from the body of the hook and thus the side walls of the opening 15 prevent the hook from rotating. The fishing line is thereafter placed between the washer elements 23 and 24 of the tensioning device and compression supplied to clamp the washer elements 23 and 24 relative to one another by adjusting the wing nut or other adjustment member 22 relative to the threaded shaft 19.

Once the fishing line has been clampingly engaged between the washer elements 23 and 24, if further tension is desired on the portion of the line intermediate the hook and the tension device, by rotating the adjustment member 22 the washer elements 23 and 24 will rotate relative to the support shaft 19 and thereby take up any slack or create additional tension without having to remove the fishing line from engagement between the washer elements. With the fishhook securely engaged in the opening 15 of the rod 11, the worm is thereafter guided toward the outer end of the rod and onto the fishhook and then along the fishing line as is shown in FIG. 10. After the worm is completely moved from the rod 11, the tensioning device may be released by the adjusting mechanism 22 and thereafter the baited hook and line is free for use, as is shown in FIG. 12. Due to the construction of the baiting device of the present invention, the fisherman is free to utilize both hands during the baiting procedure as the tension on the hook seated within the open end of the rod 11 is continuously maintained by the washer elements 23 and 24.

I claim:

1. A tool for baiting a worm to a fishing hook and line wherein the tool includes an elongated rod which extends from a base portion to an outer end and wherein the outer end includes an opening for receiving the tip of a fishhook therein, the improvement comprising, a line tensioning device mounted to said base portion of the tool, said tensioning device including a shaft extending generally outwardly with respect to said rod, a pair of washer means mounted to said shaft and having opposing faces between which the fishing line is frictionally retained, and adjusting means for selectively compressing the washer means relative to one another to thereby securely retain the fishing line taut between said tensioning device and the hook.

2. The tool of claim 1 in which each of said washer means includes an outer peripheral edge portion, said edge portions being bevelled downwardly and inwardly with respect to one another to thereby define a generally V-shaped guide for facilitating the placement of the fishing line between said opposing faces thereof.

3. The tool of claim 2 in which said washer mean are rotatably movable with respect to said shaft.

4. The tool of claim 3 wherein said shaft includes an inner portion and an outer threaded portion, said washer means being mounted in surrounding relationship to said inner portion and said adjustment means including a nut means which is threadingly engaged with said outer threaded portion.

5. The tool of claim 4 in which said washer means are generally resilient.

6. The tool of claim 5 including reinforcing means extending between the rod and the base portion of the tool.

7. The tool of claim 1 in which said washer means are generally resilient.

8. The tool of claim 1 in which each of said washer means includes an outer peripheral edge portion, said edge portions being bevelled downwardly and inwardly with respect to one another to thereby define a generally V-shaped guide for facilitating the placement of the fishing line between said opposing faces thereof, and said washer means are generally resilient.

* * * * *